(12) United States Patent
Tiirola et al.

(10) Patent No.: US 10,341,064 B2
(45) Date of Patent: Jul. 2, 2019

(54) IMPROVING COMMUNICATION EFFICIENCY

(71) Applicant: Nokia Solutions and Networks Oy, Espoo (FI)

(72) Inventors: Esa Tapani Tiirola, Kempele (FI); Kari Juhani Hooli, Oulu (FI); Timo Erkki Lunttila, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 73 days.

(21) Appl. No.: 15/308,152

(22) PCT Filed: May 8, 2014

(86) PCT No.: PCT/EP2014/059408
§ 371 (c)(1),
(2) Date: Nov. 1, 2016

(87) PCT Pub. No.: WO2015/169359
PCT Pub. Date: Nov. 12, 2015

(65) Prior Publication Data
US 2017/0055181 A1 Feb. 23, 2017

(51) Int. Cl.
*H04L 5/00* (2006.01)
*H04W 28/26* (2009.01)
(Continued)

(52) U.S. Cl.
CPC .......... *H04L 5/0001* (2013.01); *H04L 5/0037* (2013.01); *H04L 5/0055* (2013.01);
(Continued)

(58) Field of Classification Search
None
See application file for complete search history.

(56) References Cited

U.S. PATENT DOCUMENTS

| 2015/0092758 A1* | 4/2015 | Chen | H04W 16/14 370/336 |
| 2015/0098397 A1* | 4/2015 | Damnjanovic | H04W 74/08 370/329 |
| 2016/0219595 A1* | 7/2016 | Larsson | H04L 5/001 |

FOREIGN PATENT DOCUMENTS

| EP | 2059060 A2 | 5/2009 |
| WO | 2012/109195 A2 | 8/2012 |
| WO | 2013/112983 A2 | 8/2013 |

OTHER PUBLICATIONS

International Search Report and Written Opinion received for corresponding Patent Cooperation Treaty Application No. PCT/EP2014/059408, dated Dec. 19, 2014, 10 pages.

(Continued)

*Primary Examiner* — Christine T Duong
(74) *Attorney, Agent, or Firm* — Squire Patton Boggs (US) LLP (57) ABSTRACT

There is provided a method for defining at least one channel reservation window the method comprising: setting length for each of the at least one channel reservation window such that each channel reservation window comprises a plurality of sub-frames; dividing the length of each channel reservation window into a transmission part and an idle part, wherein the idle part consists of one or more symbols in one sub-frame; maximizing, at a symbol level accuracy, the length of the transmission part such that a ratio between the length of the idle part and the length of the transmission part fulfills a predetermined criterion; and concatenating the transmission part and the idle part so as to form the channel reservation window.

22 Claims, 5 Drawing Sheets

(51) Int. Cl.
H04W 72/04 (2009.01)
H04W 74/08 (2009.01)

(52) U.S. Cl.
CPC ........... *H04L 5/0092* (2013.01); *H04W 28/26* (2013.01); *H04W 72/0453* (2013.01); *H04W 74/0808* (2013.01)

(56) References Cited

OTHER PUBLICATIONS

"Review of Regulatory Requirements for Unlicensed Spectrum", 3GPP TSG-RAN meeting #63, RP-140054, Agenda: 14.2, Alcatel-Lucent, Mar. 3-6, 2014, pp. 1-16.

"Broadband Radio Access Networks (BRAN); 5 GHz high performance RLAN; Harmonized EN covering the essential requirements of article 3.2 of the R&TTE Directive" ETSI EN 301 893, V1.7.1, Jun. 2012, pp. 1-90.

International Search Report and Written Opinion received for corresponding Patent Cooperation Treaty Application No. PCT/EP2014/062345, dated Dec. 17, 2014, 13 pages.

Ratasuk et al., "License-exempt LTE deployment in heterogeneous network", International Symposium on Wireless Communication Systems, Aug. 28-31, 2012, pp. 246-250.

"3rd Generation Partnership Project; Technical Specification Group Radio Access Network; Evolved Universal Terrestrial Radio Access (E-UTRA); Base Station (BS) radio transmission and reception (Release 14)", 3GPP TS 36.104, V14.1.0, Sep. 2016, pp. 1-211.

"3rd Generation Partnership Project; Technical Specification Group Radio Access Network; Evolved Universal Terrestrial Radio Access (E-UTRA); Base Station (BS) conformance testing(Release 14)", 3GPP TS 36.141, V14.1.0, Sep. 2016, pp. 1-316.

"IEEE Standard for Air Interface for Broadband Wireless Access Systems", IEEE Std 802.16-2012, Aug. 17, 2012, 2544 Pages.

Office action received for corresponding Vietnam Patent Application No. 1-2016-04677, dated Dec. 26, 2016, 1 page of office action and 1 page of translation available.

Office action received for corresponding Canadian Patent Application No. 2947918, dated Feb. 2, 2017, 4 pages.

3rd Generation Partnership Project: "Technical Specification Group Radio Access Network: Evolved Universal Terrestrial Radio Acess(E-UTRA), Physical Layer Procedures," (Release 12) TS 36.213 V12.0.0, Dec. 2013. pp. 1-186.

Korean Office Action dated Sep. 6, 2018, issued in Korean Patent Appln. No. 2016-7034461.

* cited by examiner

IMPROVING COMMUNICATION EFFICIENCY

RELATED APPLICATION

This application was originally filed as Patent Cooperation Treaty Application No. PCT/EP2014/059408 filed May 8, 2014.

FIELD OF THE INVENTION

The invention relates generally to improving communication efficiency. More specifically, the invention relates to enabling efficient communication on an unlicensed band.

BACKGROUND

Wireless data usage is growing exponentially and operators are facing capacity constraint in the networks. As licensed communication resources are limited (and can be very costly to obtain) and there is an ever increasing demand for the resources, one possible approach is to apply unlicensed frequency bands for the communication.

BRIEF DESCRIPTION OF THE INVENTION

The invention is defined by the independent claims.

According to an aspect of the invention, there is provided a computer program product readable by a computer and comprising program instructions which, when loaded into an apparatus, execute the method according to any of the appended claims.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

Some embodiments of the invention are defined in the dependent claims.

LIST OF THE DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced (LTE-A), and/or 5G system.

Figure 1:
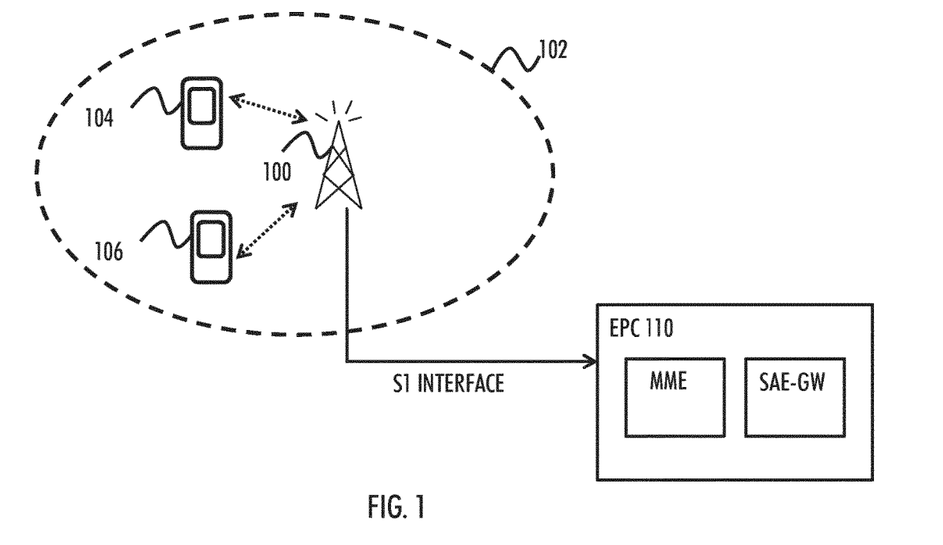
FIG. 1 presents a radio communication network.

FIG. 1 shows a network to which the embodiments may be applicable. Radio communication networks, such as the Long Term Evolution (LTE) or the LTE-Advanced (LTE-A) of the $3^{rd}$ Generation Partnership Project (3GPP), are typically composed of at least one base station 100 providing coverage to a cell 102. Each cell 102 may be, e.g., a macro cell, a micro cell, or a pico-cell, for example. The base station 100 may be evolved node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. In the case of multiple eNBs in the communication network, the eNBs may be connected to each other with an X2 interface as specified in the LTE. The eNB 100 may be further connected via an S1 interface to an evolved packet core (EPC) 110, more specifically to a mobility management entity (MME) and to a system architecture evolution gateway (SAE-GW).

The network may serve at least one terminal device 104, located within the cell 102. The terminal devices 104, 106 may communicate with each other via the base station 100. The terminal device 104,106 may be a terminal device of a cellular communication system, e.g. a computer (PC), a laptop, a palm computer, a mobile phone, a smart phone or any other user terminal or user equipment capable of communicating with the cellular communication network.

Typically the network uses licensed bands for communication. However, at times there exists a need to apply more resources. This may be accomplished by performing communications on unlicensed bands, such as LTE-Unlicensed (LTE-U). An example frequency band for such unlicensed LTE-operation may be the 5 GHz industrial, scientific and medical (ISM) band. Although the licensed band LTE may have better service quality than the unlicensed spectrum and the LTE-U does not remove the need to have more licensed band, the LTE-U may be advantageous to meet the user demands in some situations. One solution may also be WiFi offloading, but the LTE can perform better than WiFi when the system becomes heavily loaded.

Before being permitted to transmit on a given unlicensed radio band, a user or an access point (such as an evolved node B (eNB) of the LTE-A) may, depending on the regulatory requirements, may need to monitor the given radio frequency for a short period of time to ensure the spectrum is not already occupied by some other transmission. This requirement is referred to as List-before-talk (LBT)-procedure.

In an embodiment, the proposed approach is applicable to frame based equipment. Such frame based equipment are equipment where the transmit/receive structure is not directly demand-driven but has fixed timing. For the frame based equipment, the LBT operation may be defined as follows. Before starting transmissions on an operating channel, the equipment may be required to perform a Clear Channel Assessment (CCA). The equipment may observe the operating channel(s) for the duration of the CCA observation time. This may be at least 20 microseconds. The energy detection threshold for the CCA may be proportional to the maximum transmission power of the transmitter.

The operating channel is considered occupied if the energy level in the channel exceeds a pre-set energy detection threshold. If the equipment finds the operating channel occupied, the equipment may not transmit on that channel during a next, predefined, fixed frame period. However, if the equipment finds the operating channel(s) to be clear, the equipment may transmit on the channel.

The total time during which the equipment may have transmissions on a given channel without re-evaluating the availability of that channel, is defined as a channel occupancy time. The channel occupancy time may be in the range 1 ms to 10 ms and the minimum idle period may be at least 5% of the channel occupancy time used by the equipment for the current fixed frame period. Depending on the regulatory requirements, channel occupancy times outside the given range (from 1 ms to 10 ms) may also be considered.

Although these rules may partly define some boundary conditions for the system operating on the respective spectrum, these regulations do not provide for a detailed solution on how to define and operate the system. For example, one problem related to the LBT in connection of LTE-U is how to support LBT on top of the current LTE radio frame structure such that commonality with current the LTE radio frame structure is maximized and system overhead due to the LBT is minimized.

Therefore, there is proposed a channel reservation window arrangement which is suitable at least for the LTE-U operation. Thus, the proposed channel reservation window may support the LBT-procedure (such as the CCA). The channel reservation window may be used for subframe transmissions. Thus, the subframe is accommodated into the proposed channel reservation window. The proposed channel reservation window may comply with a maximum number of DL resources that can be supported without violating the LBT requirements.

Figure 2:
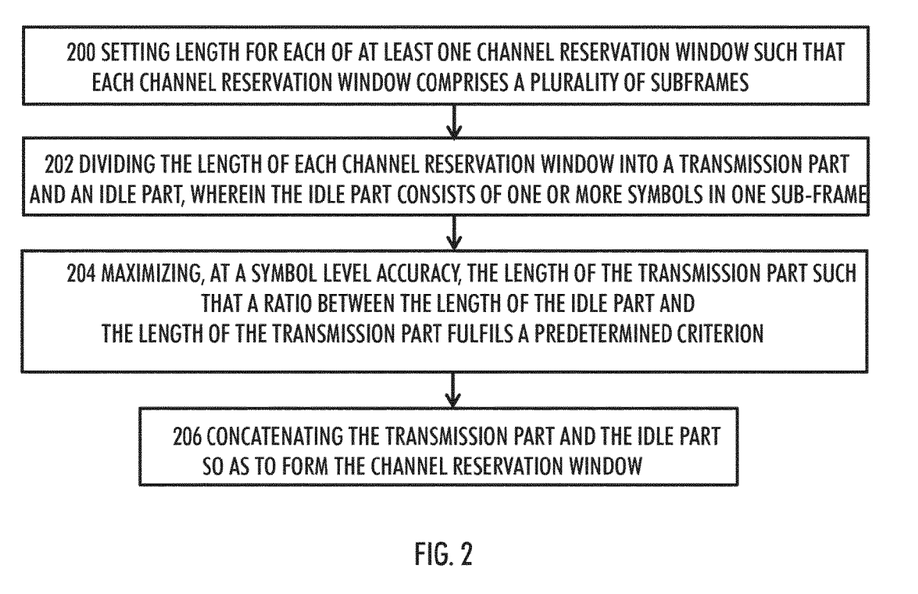
FIG. 2 shows a method according to an embodiment.
Figure 3A:
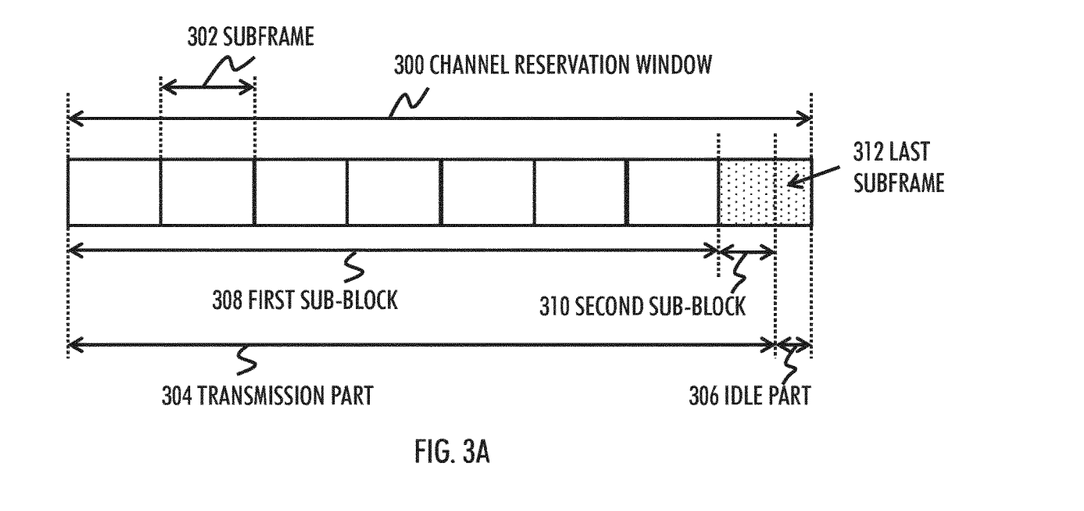
FIGS. 3A and 3B show an example channel reservation window format according to an embodiment.
Figure 3B:
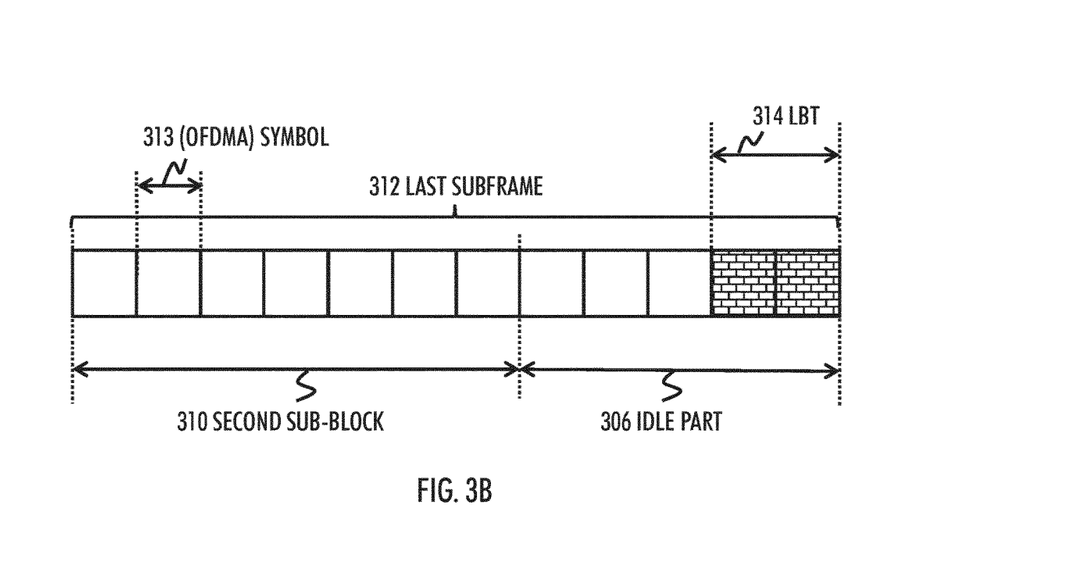

As shown in FIGS. 2, 3A and 3B, in order to define at least one channel reservation window (CRW) 300, the eNB 100 may, in step 200, set a length for each of the at least one channel reservation window 300 such that each channel reservation window comprises a plurality of subframes 302. Thus, in an embodiment, the length of a given channel reservation window 300 may be a multiple of a subframe length. In the example of FIG. 3A, the channel reservation window comprises 8 sub-frames. In the LTE, each subframe is set to last for 1 ms and, therefore, the length of the channel reservation window 300 of FIG. 3 may be 8 ms. It may also be recalled that, in the LTE, each subframe comprises two slots in time domain and each slot comprises either 6 symbols in case of an extended cyclic prefix (CP), or 7 symbols in case of normal CP.

In an embodiment, the length of the channel reservation window 300 varies between 2 ms and 10 ms. If we denote the number of subframes 302 as N, then N∈[2, 3, . . . , 10]. As known, ten consecutive subframes 302 form a frame of the LTE. Thus, using N∈[2, 3, . . . , 10] may be advantageous in order to provide backwards compatibility, for example. In another embodiment, and depending on the regulatory rules, N=1 is also an option.

In step 202, the length of each channel reservation window may be divided into a transmission part 304 and an idle part 306. The transmission part 304 may correspond to the fixed frame period mentioned earlier. The idle part 306 may correspond to a discontinuous transmission (DTX) part which may not contain any transmission. The idle part 306 may consists of one or more symbols in one sub-frame. As further shown in FIG. 3B with bricked blocks, the idle part 306 may comprise the LBT-procedure 314, such as the CCA observation time (as explained above). The CCA process 314 may be performed during at least part of the idle part 306. In an embodiment, the CCA 314 is performed at the end of the idle part 306.

One problem related to the division performed in step 202 is how to dimension these parts 304 and 306 in a way which enables efficient data transmission and reliable CCA process 314. In order to solve this, the base station 100 may in step 204 maximize, at a symbol level accuracy, the length of the transmission part 304 such that a ratio between the length of the idle part 306 and the length of the transmission part 304 fulfils a predetermined criterion. Thus, maximizing the length of the transmission part 304 comprises maximizing the number of symbols of the transmission part 304 such that the predetermined criterion is fulfilled. In a typical scenario, symbol length is assumed to be fixed when maximizing the number of symbols of the transmission part 304. However, in some embodiments, it is also possible to consider symbols having different length options (e.g. T, T/2, T/4, etc.).

In an embodiment, the symbols are orthogonal frequency-division multiple access (OFDMA) symbols. Assuming each subframe 32 has Y OFDMA symbols, the channel reservation window 300 may comprises altogether N times Y symbols. Now the maximization of the length of the transmission part 304 may denote finding/determining the maximum number of OFDMA symbols for the transmission part 304 so that the idle part 306 still lasts at least the minimum length. There may be a presser requirement for length of the idle part 306, which needs to be fulfilled. In an embodiment, the predetermined criterion requires that the length of the idle part is at least certain percentage of the length of the transmission part. In an embodiment, the certain percentage is five percent. Thus, the required length of the idle part 306 may depend on the size of the channel reservation window 300. Therefore, setting the length for the idle part 306 may not be a straight-forward task, but requires consideration of the size of the channel reservation window 300, for example.

Then, in step 206, the base station 100 may concatenate the transmission part 304 and the idle part 306 so as to form the channel reservation window 300. In an embodiment, the transmission part 304 precedes the idle part 306. In this embodiment, the idle part 306 (and the CCA process 314 of the idle part 306) of a previous channel reservation window precedes the transmission part 304 of the following channel reservation window. In another embodiment, the idle part 306 precedes the transmission part 304 in the channel reservation window 300.

Thereafter, the base station 100 may proceed to radio frame transmission according to the channel reservation window 300.

Let us look at closer on some embodiments on how the maximization problem may be solved. In an embodiment, as shown also in FIGS. 3A and 3B, the transmission part 304 is further divided into two sub-blocks, namely into a first sub-block 308 and into a second sub-block 310. In an embodiment, the length of the first sub-block 308 corresponds to the length of the channel reservation window 300 minus one subframe, i.e., to N−1 sub-frames. As a result, the idle part 306 and the second sub-block 310 together form the one remaining sub-frame of the channel reservation window 300. This remaining subframe comprising the idle part 306 and the second sub-block 310 is shown in FIG. 3A with a dotted block 312. The length of the second sub-block 310 corresponds to the length of one sub-frame 312 minus the length of the idle part 306.

In an embodiment, the idle part 306 and the second sub-block 310 are comprised in the last sub-frame 312 of the channel reservation window 300. This may provide ease of configuration.

FIG. 3B opens up this subframe 312 in more details. As earlier implied, each subframe 312 comprises a predetermined number of symbols. In case of the normal CP, there are altogether 14 symbols (2 times 7 symbols) in one LTE subframe. In case of the extended CP, there are altogether 12 symbols (2 times 6 symbols) in one LTE subframe. The example Figure of 3B represents the case with the extended CP, so there are 12 symbols 313 in the LTE subframe 312. In an embodiment, these symbols 313 are orthogonal frequency-division multiple access (OFDMA) symbols.

The base station 100 may then maximize, at the symbol level accuracy (at a symbol granularity), the length of the second sub-block 310 within the subframe 312 such that the ratio between the length of the idle part 306 and the length of the transmission part 304 fulfils the predetermined criterion. It may be noted that the second sub-block 310 is a part of the transmission part 304. As the maximization is done at the symbol level accuracy (e.g. at an accuracy of one OFDMA symbol), maximizing the length of the second sub-block 310 comprises maximizing the number of symbols 313 of the second sub-block 310 such that the predetermined criterion is fulfilled. Thereafter, the length of the second sub-block 310 within the subframe 312 is an integer multiple of the length of the symbol 313. This provides ease of implementation.

In an embodiment, the predetermined criterion requires that the length of the idle part 306 is at least five percent of the length of the transmission part 304. This may ensure that the CCA process 314 has enough resources to reliably detect any ongoing transmissions. However, other percentage values may be applied, depending on the current regulations, for example. Let us denote this predefined percentage value as X from here on. As an example, if the percentage value is five percent, then X=0.05.

In an embodiment, the number M of symbols 313 in the second sub-block 310 may be given as follows:

$$M = \left\lfloor \frac{Y - (N-1)XY}{X+1} \right\rfloor \quad (1)$$

where $\lfloor A \rfloor$ is the floor operation of A and Y corresponds to the number of (e.g. OFDMA) symbols per each subframe 302. Parameter N is the length of the channel reservation window 300 in milliseconds, ($N \in [2, 3, \ldots, 10]$), that is the number of subframes 302 in the channel reservation window 300. Following the Equation (1), $M \in [0, 1, \ldots, Y-1]$.

Figure 4:
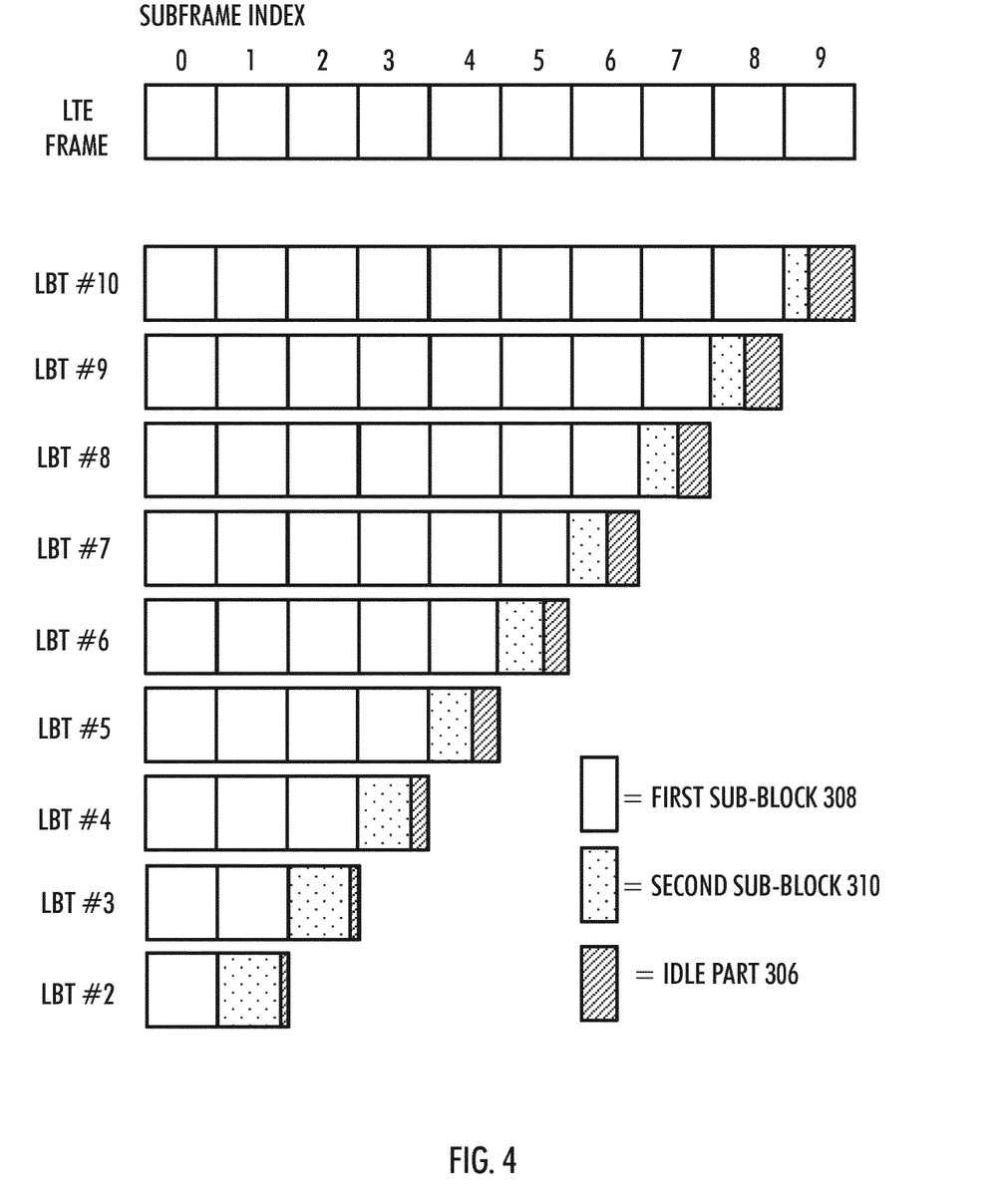
FIG. 4 depicts a plurality of different channel reservation windows, according to some embodiments.

When applying this equation and the steps provided above, the length of the idle part 306 increases in proportion to the length of the transmission part 304. This is shown in FIG. 4, where nine different LBT-enabling channel reservation window formats are given, each marked as LBT #. The upper part of the Figure shows, for the sake of comparison, a normal LTE radio frame having ten subframes (0, 1, 2, . . . 9). As shown, each LBT window #2-#10, comprises at least 2 subframes and one of the subframes includes the second sub-block 310 (marked with dotted blocks) and the idle part 306 (marked with blocks having right-leaning diagonal lines). As may be seen, the size of the idle part 306 becomes larger and the size of the second sub-block 310 becomes smaller as the channel reservation window 300 increases in size.

As said, the size/length of the CP may affect the number of symbols in a given subframe. Thus, in an embodiment, the size of the cyclic prefix is taken into account when maximizing the length (i.e. the number of symbols) of the transmission part 304. In an embodiment, the length of the CP is assumed equal for all symbols. However, in an embodiment, if the cyclic prefix length/size is not equal for all symbols, the varying cyclic prefix length is taken into account when defining the channel reservation window 300 so that it is ensured that the predetermined criterion is met.

It may be noted that the equation (1) may ignore the fact that the CP length may be larger at the beginning of a subframe. Thus, in an embodiment, the "equal to" sign (=) may be changed to "equal to or smaller than" sign (≤).

Tables 1 and 2 show different LBT enabling channel reservation windows. Table 1 is for a case with the normal CP (14 symbols in one sub-frame 302, Y=14), whereas Table 2 is for a case with the extended CP (12 symbols in one sub-frame 302, Y=12). In both cases, the parameter X is set to be 5%, as an example value. These channel reservation window formats enable the maximum utilization of LTE-U downlink resources in any given LBT scenario. The lengths are given in milliseconds in the Tables.

TABLE 1

Channel reservation window formats for the normal CP, Y = 14

| | Length N of the channel reservation window 300 | Length (= N − 1) of the first subblock 308 | Length M of the second subblock 310 | Length (= Y − M) of the idle part 306 | Length of the transmission part 304 | Length of the idle part 306 | Ratio (=304/306) in %. Requirement: ≥5% |
|---|---|---|---|---|---|---|---|
| LBT-10 | 10 | 9 | 7 | 7 | 9.5 | 0.5 | 5.26 |
| LBT-9 | 9 | 8 | 8 | 6 | 8.57 | 0.43 | 5 |
| LBT-8 | 8 | 7 | 8 | 6 | 7.57 | 0.43 | 5.66 |
| LBT-7 | 7 | 6 | 9 | 5 | 6.64 | 0.36 | 5.38 |
| LBT-6 | 6 | 5 | 10 | 4 | 5.71 | 0.29 | 5 |
| LBT-5 | 5 | 4 | 10 | 4 | 4.71 | 0.29 | 6.06 |
| LBT-4 | 4 | 3 | 11 | 3 | 3.79 | 0.21 | 5.66 |
| LBT-3 | 3 | 2 | 12 | 2 | 2.86 | 0.14 | 5 |
| LBT-2 | 2 | 1 | 12 | 2 | 1.86 | 0.14 | 7.69 |

TABLE 2

Channel reservation window formats for the extended CP, Y = 12

| | Length N of the channel reservation window 300 | Length (= N − 1) of the first subblock 308 | Length M of the second subblock 310 | Length (= Y − M) of the idle part 306 | Length of the transmission part 304 | Length of the idle part 306 | Ratio (=304/306) in %. Requirement: ≥5% |
|---|---|---|---|---|---|---|---|
| LBT-10 | 10 | 9 | 6 | 6 | 9.5 | 0.5 | 5.26 |
| LBT-9 | 9 | 8 | 6 | 6 | 8.5 | 0.5 | 5.88 |
| LBT-8 | 8 | 7 | 7 | 5 | 7.58 | 0.42 | 5.49 |
| LBT-7 | 7 | 6 | 8 | 4 | 6.67 | 0.33 | 5 |
| LBT-6 | 6 | 5 | 8 | 4 | 5.67 | 0.33 | 5.88 |
| LBT-5 | 5 | 4 | 9 | 3 | 4.75 | 0.25 | 5.26 |
| LBT-4 | 4 | 3 | 9 | 3 | 3.75 | 0.25 | 6.67 |
| LBT-3 | 3 | 2 | 10 | 2 | 2.83 | 0.17 | 5.88 |
| LBT-2 | 2 | 1 | 10 | 2 | 1.83 | 0.17 | 9.09 |

In an embodiment, the second sub-block 310 may be considered as a specific downlink pilot time slot (DwPTS) size-variant defined for the LTE-U. The DwPTS is a part of special subframe of a time-division (TD) LTE frame structure.

Figure 5A:
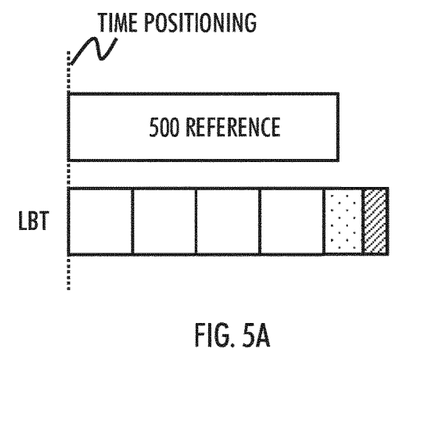
FIGS. 5A and 5B illustrate timing of the channel reservation window, according to some embodiments.
Figure 5B:
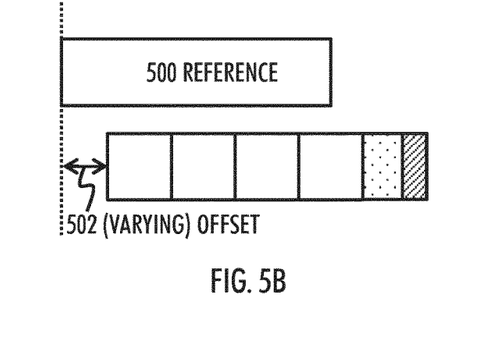

Let us then look at further embodiments. In an embodiment, the transmission part 304 may be time positioned with respect to a predetermined reference 500, as shown in FIGS. 5A and 5B. For example, the time positioning may define that the transmission on the channel reservation window 300 starts at the same time as a transmission of the reference 500. This is shown in FIG. 5A. In another embodiment, there may be an offset parameter 502, which may define the start of the transmission part 304 with respect to the reference 500. The time offset may be valid for a predefined radio frame number. As the transmission part 304 and the idle part 306 are consecutive, time positioning the transmission part 304 simultaneously defines a time position for the idle part 306. Similarly, time positioning the idle part 306 may define the start timing of the transmission part 304.

In an embodiment, the reference 500 comprises a transmission of one of the following: a primary synchronization signal (PSS), a secondary synchronization signal (SSS). Use of PSS/SSS, may be advantageous also from the point of view that typically other reference signals are more spread over the radio frame duration. It may be noted also that the PSS/SSS may be used to determine radio frame timing also in the normal LTE. The reference 500 may be the transmission of the PSS/SSS on a predetermined radio frame, such as radio frame #0.

In an embodiment, the bases station participates in carrier aggregation (CA) and the defined channel reservation window 300 is applied for transmissions on a secondary cell. Thus, there may be CA applied in the network for enhancing the communication efficiency and resources.

In an embodiment, the LTE-U may be developed so that it relies on the licensed band LTE operations. For example, in the CA, the primary cell (PCell) may operate on the licensed band whereas the unlicensed band may provide resources for the secondary cell (SCell) for transmitting a secondary component carrier (SCC). That is, the SCell may operate on the unlicensed band, whereas the PCell may operate on the licensed band. In an example, transmissions on SCell comprise only downlink transmissions while PCell is at least partly used for necessary uplink transmissions. Such SCell may be termed as supplementary downlink cell (SDL). Thus, in an embodiment, the channel reservation window 300 is applicable to the SDL operation. In an embodiment, the PCell is served by another base station than the eNB 100 providing the SCell and the SCC.

In an embodiment, the reference 500 comprises a radio frame transmitted on a primary component carrier (PCC). The PCC may be transmitted in the PCell. Thus, there may be a fixed timing relationship between the Pcell DL and the LTE-U operation (e.g. comprising the transmission on the channel reservation window 300). For example, the beginning of a radio frame transmitted on the PCC and the beginning of a radio frame transmitted according to the channel reservation window on the SCC may be time aligned.

In an embodiment, radio frame and channel reservation window have different lengths. In such case, the timing relationship between the radio frame and channel reservation window depend on the radio frame or the subframe number. Radio frame may be used to determine e.g. time positions of certain signals on SCell, such as the PSS/SSS, while channel reservation window may be used to meet the regulatory requirements on the fixed frame period. For example, the position of the idle part 306 may be determined at least partly based on the channel reservation window, whereas the position of specific signals (e.g. the PSS/SSS) may be at least partly determined based on the radio frame.

In an embodiment, the radio frames on SCell and PCell may be time aligned. This may provide ease of specification, configuration and implementation.

In an embodiment, the subframes of the radio frame transmitted on the PCC and the subframes of the radio frame transmitted on the SCC according to the channel reservation window 300 are time aligned. Time aligning the subframes may provide efficiency. In another embodiment, there is a full time alignment between the PCell and LTE-U operation. This may mean that the symbols are fully time aligned as well.

In yet one embodiment, as shown in FIG. 5B, the offset parameter 502 may determine the beginning of the transmission part 304 (i.e. the beginning of the radio frame transmission on the channel reservation window 300) with respect to the beginning of a radio frame transmitted on the PCC (or the beginning of the PSS/SSS in a predefined radio frame, as one non-limiting alternative). In an embodiment, the applied timing offset 502 in the cell 102 is different than a corresponding timing offset applied in a neighbouring cell. Having configurable offset 502 may be used to ensure that the CCAs 314 are not time aligned in neighbouring non-coordinated LTE-U cells. This may be useful for the LTE-U coexistence with multiple LTE-U deployments by different operators, all served by PCells that are time-synchronized (e.g. time division duplex (TDD)-cells where different operators are synchronized).

In an embodiment, the subframe 312 of the channel reservation window 300 (containing the second sub-block 310 and the idle part 306) may be aligned with a TDD special subframe by using LBT-10 or LBT-5 channel reservation windows with an appropriate offset value 502. The TDD frame format has a periodicity of 5 ms, so the use of LBT #5 or LBT #10 may be efficient.

Figure 6A:
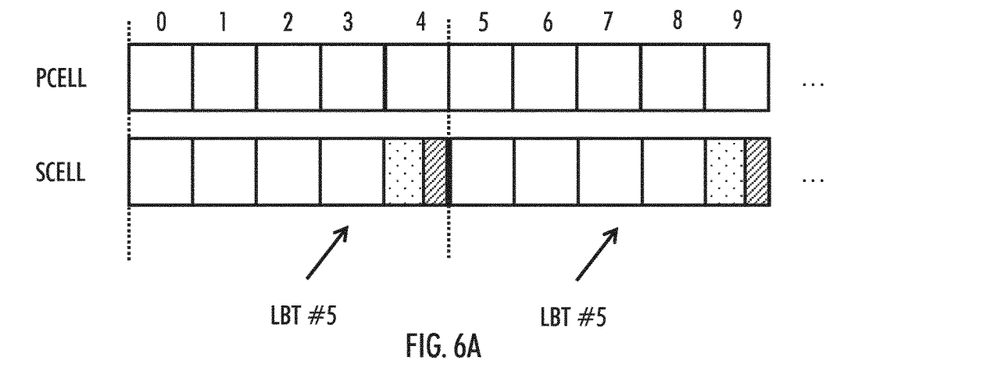
FIGS. 6A and 6B illustrate static and dynamic usage of the channel reservation windows, according to some embodiments.

As shown in FIG. 6A, in one embodiment, the base station 100 may apply, during the transmission of the PCC on the PCell, an integral number of channel reservation windows 300, each having the same length. That is, the usage of the LTE-U channel reservation window formats may be static or semi-static. For instance, in FIG. 6A, there are two LBT-enabling channel reservation windows, each having five subframes. This may provide ease of complexity. The eNB 100 may configure the LTE-U channel reservation window format usage and timing with respect to the PCell via higher layer signalling. In an embodiment, the usage of the channel reservation window format usage and timing is pre-coded to the eNB 100.

Figure 6B:
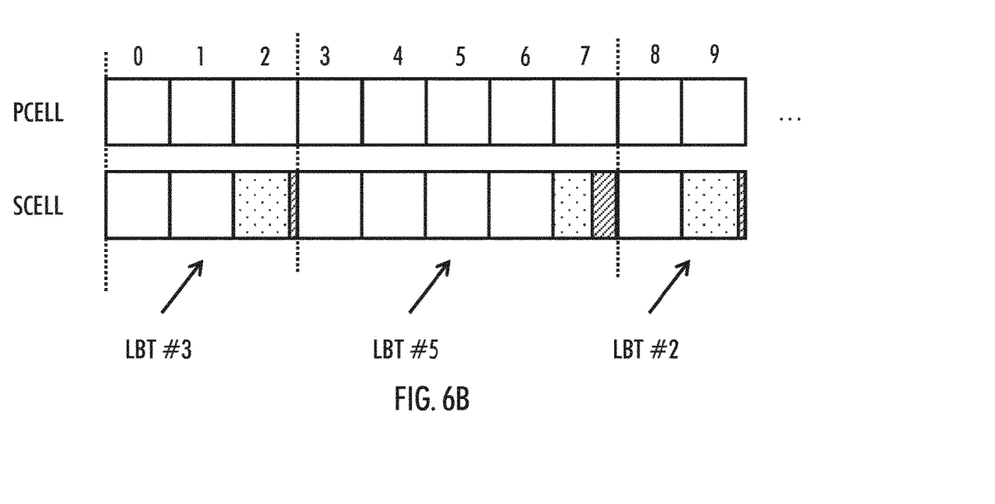

In another embodiment, a varying LTE-U channel reservation window format from channel reservation window to channel reservation window may be applied. That is, each cell/eNB may select one of the available LTE-U channel reservation window formats at a time. This is shown in FIG. 6B. In FIG. 6B, there are three different LBT-enabling channel reservation window formats applied, LBT #3, LBT #5, and LBT #2. The dotted vertical lines show that the beginnings of the LBT-enabling channel reservation window may be time aligned.

In this embodiment, the eNB 100 may define a plurality channel reservation windows with different lengths. It may be noted, that in an embodiment, the available LTE-U channel reservation window formats for the SDL may be tabulated in the specification and pre-coded to the eNB 100. Moreover, in an embodiment, the set of LTE-U channel reservation window formats may be configured to the UEs 104, 106 (e.g. via higher layers). UE may use the configured channel reservation window format for determining the position the transmission part 304 and for adjusting PDSCH reception accordingly, in particular in the subframe containing the idle part 306.

The eNB 100 (or e.g. a user equipment) may, after detecting that the channel is free for transmission (e.g. after the CCA energy detection), select one of the plurality of channel reservation windows for a data transmission to a target device (such as to a user terminal or to an eNB, for example).

From the point of view of the eNB 100, the eNB 100 may then indicate the selected channel reservation window 300 to a target user terminal (e.g. the UE 104). For example, the eNB 100 may include the LTE-U channel reservation window format indicator in layer 1 (L1) signalling. As one non-limiting option, the indication may be made by including 1-4 bits in a scheduling assignment on the Physical Downlink Control Channel (PDCCH) or on the enhanced PDCCH. The eNB 100 may then perform the data transmission in the selected channel reservation window 300 to the user terminal 104.

In an embodiment, the data transmission from the eNB 100 to the target user terminal is performed on the SCell and acknowledgement feedback for the data transmission is obtained on the PCell. Thus, the channel reservation window 300 is used for the transmissions on the SDL, while the uplink signaling from the UE is received on the PCell which may operate on a licensed band and thus may not need to use the LBT/CCA process.

In an embodiment, the applied channel reservation window format, varying from channel reservation window to channel reservation window, may be determined according to a pseudo-random pattern determined at least partially based on SCell physical cell identity. An outcome of a pseudo-random number generator depending for example on a channel reservation window number or on a subframe number and initialised at least partially with SCell physical cell identity may be used to determine the applied channel reservation window format. This embodiment may support fair LBT-procedure and access to the radio channel between neighbouring cells.

Figure 7:
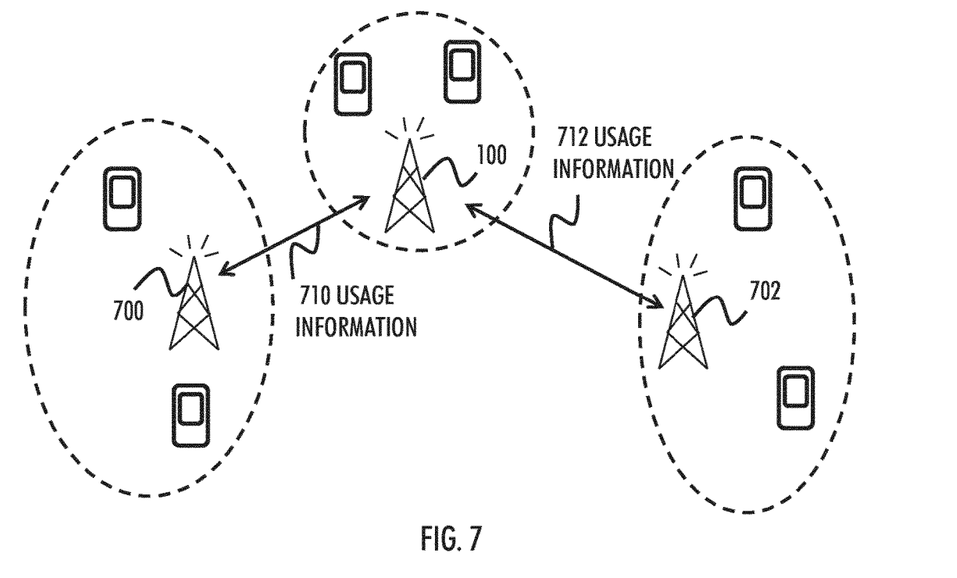
FIG. 7 shows exchange of channel reservation window usage data between cells, according to an embodiment.

In one embodiment, as shown in FIG. 7, the eNB 100 may exchange channel reservation window usage information with at least one neighbouring network node, such as with eNBs 700 and 702. This embodiment may support coordination of the LTB channel reservation window format usage among neighbouring cells (marked with dashed circles in FIG. 7). This may enable different interference coordination schemes for the CCA, e.g. synchronizing the idle periods 306 between neighbouring cells (e.g. in reuse 1 scenario) or de-synchronization of the idle periods 306 between the neighbouring cells (CCA operation within coordinated cells). As one option, this may ensure that neighbouring eNBs do not use the same timing for the CCA process. The coordination may be made via the X2 signalling 710, 712, for example. The information elements coordinated to the neighbouring cells may include, e.g., the usage of LTE-U channel reservation window formats and the timing of the LTE-U operation. The timing may include the information on how the channel reservation windows 300 are timed in different cells.

In an embodiment, the base station 100 may decide to apply the formed channel reservation window 300 instead of any predefined other channel reservation window. In an embodiment, this mandatory selection applies only in case the base station 100 provides the SCell in the CA and uses the generated channel reservation window 300 on the SCC.

Although the description has been written so that the base station 100 performs the method of FIG. 2, the method may be performed by any radio device performing radio communication according to the CCA requirements, such as a user equipment.

As OFDMA symbols are used in the description as an example, it may be noted that a block-processing based approach is valid. This may mean that the proposed embodiments are equally valid for any waveform based on block-processing, including e.g. the Discrete Fourier Transform Spread OFDMA (DFT-S-OFDMA).

In an embodiment, the proposed method is applicable to downlink (DL) communication. In an embodiment the proposed method is applicable to communication taking place on a supplementary downlink cell (SDL).

In an embodiment, the proposed solution may have maximum commonality with the current LTE frame structures. This may be enable backward compatibility and straight-forward implementation. In an embodiment, overhead due to the CCA may be minimized. In an embodiment, the proposed channel reservation window 300 facilitates good interworking with the PCell in case of using the LBT (and, thus, the generated channel reservation window 300) on the SCell. In an embodiment, the proposed channel reservation windows provide flexibility to match requirements in different bands and/or regions, while at the same time providing maximization of the LTE-U channel utilization and respecting regulatory requirements.

Figure 8:
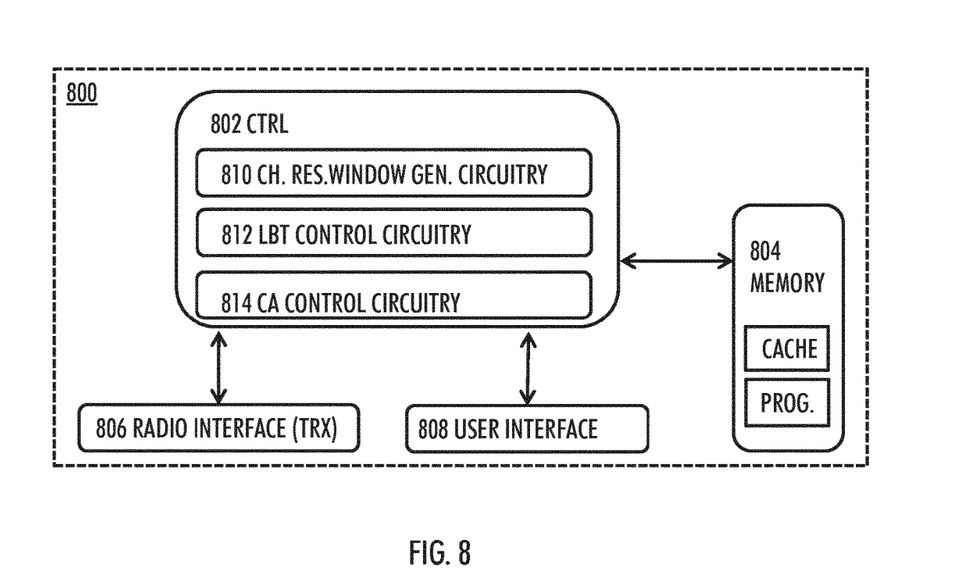
FIG. 8 illustrates an apparatus, according to an embodiment.

An embodiment, as shown in FIG. 8, provides an apparatus 800 comprising a control circuitry (CTRL) 802, such as at least one processor, and at least one memory 804 including a computer program code (PROG), wherein the at least one memory and the computer program code (PROG), are configured, with the at least one processor, to cause the apparatus to carry out any one of the described processes. The memory may be implemented using any suitable data storage technology, such as semiconductor based memory devices, flash memory, magnetic memory devices and systems, optical memory devices and systems, fixed memory and removable memory.

In an embodiment, the apparatus 800 may be or be comprised in a base station (also called a base transceiver station, a Node B, a radio network controller, or an evolved Node B, for example). In an embodiment the apparatus 800 is or is comprised in the eNB 100.

In another embodiment, the apparatus 800 may comprise the terminal device of a cellular communication system, e.g. a user equipment (UE), a user terminal (UT), a computer (PC), a laptop, a tabloid computer, a cellular phone, a mobile phone, a communicator, a smart phone, a palm computer, or any other communication apparatus. Alternatively, the apparatus 800 is comprised in such a terminal device. Further, the apparatus 800 may be or comprise a module (to be attached to the UE) providing connectivity, such as a plug-in unit, an "USB dongle", or any other kind of unit. The unit may be installed either inside the UE or attached to the UE with a connector or even wirelessly.

The apparatus 800 may further comprise communication interface (TRX) 806 comprising hardware and/or software for realizing communication connectivity according to one or more communication protocols. The TRX may provide the apparatus with communication capabilities to access the radio access network, for example.

The apparatus 800 may also comprise a user interface 802 comprising, for example, at least one keypad, a microphone, a touch display, a display, a speaker, etc. The user interface 808 may be used to control the apparatus by the user.

The control circuitry 802 may comprise 810 a channel reservation window generation circuitry 810 for generation of at least one channel reservation window 300, according to any of the embodiments. A listen-before-talk (LBT) control circuitry 812 may be responsible of executing the LBT process, such as the CCA process. A carrier aggregation (CA) control circuitry 814 may be for handling CA operations, such as configuring the apparatus 800 to serve the SCell and transmitting frames in the channel reservation window 300 on the SCC.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example, and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured, with the at least one processor, to cause the apparatus to perform operations comprising:
setting length for each of at least one channel reservation window such that each of the at least one channel reservation window comprises a plurality of subframes;
dividing the length of each channel reservation window into a transmission part and an idle part, wherein the idle part comprises one or more symbols in one subframe;
maximizing, at a symbol level accuracy, the length of the transmission part such that a ratio between the length of the idle part and the length of the transmission part fulfils a predetermined criterion; and
concatenating the transmission part and the idle part so as to form the channel reservation window.

2. The apparatus of claim 1, wherein the apparatus is further caused to perform operations comprising:
dividing the transmission part into a first and a second sub-block, wherein length of the first sub-block corresponds to the length of the channel reservation window minus one subframe and wherein the idle part and the second sub-block are comprised in the same sub-frame; and
maximizing, at the symbol level accuracy, the length of the second sub-block within the subframe such that the ratio between the length of the idle part and the length of the transmission part fulfils the predetermined criterion.

3. The apparatus of claim 1, wherein the idle part and the second sub-block are comprised in the last sub-frame of the channel reservation window.

4. The apparatus of claim 1, wherein the predetermined criterion requires that the length of the idle part is at least a certain percentage of the length of the transmission part.

5. The apparatus of claim 1, wherein the idle part accommodates a clear channel assessment process.

6. The apparatus of claim 1, wherein the apparatus is further caused to perform operations comprising:
time positioning the transmission part with respect to a predetermined reference.

7. The apparatus of claim 6, wherein the reference comprises a radio frame transmitted on a primary component carrier.

8. The apparatus of claim 7, wherein the apparatus is further caused to perform operations comprising:
time aligning the subframes of the radio frame transmitted on the primary component carrier and the subframes of the radio frame transmitted on a secondary component carrier according to the channel reservation window.

9. The apparatus of claim 7, wherein the apparatus is further caused to perform operations comprising:
applying a timing offset between the beginning of a radio frame transmitted on the primary component carrier and the beginning of the radio frame transmitted on the secondary component carrier according to the channel reservation window.

10. The apparatus of claim 9, wherein the applied timing offset is different than a corresponding timing offset applied in a neighbouring cell.

11. The apparatus of claim 1, wherein the apparatus participates in carrier aggregation and wherein the defined at least one channel reservation window is applied for transmissions on a secondary cell on an unlicensed band, and a primary cell of the carrier aggregation operates on a licensed band.

12. The apparatus of claim 11, wherein data transmission is performed on the secondary cell and acknowledgement feedback for the data transmission is obtained on the primary cell.

13. The apparatus of claim 1, wherein the apparatus is further caused to perform operations comprising:
selecting one of a plurality of channel reservation windows having different lengths for data transmission.

14. The apparatus claim 13, wherein the apparatus is further caused to perform operations comprising:
indicating the selected channel reservation window to a target user terminal; and
performing the data transmission in the selected channel reservation window to the user terminal.

15. The apparatus of claim 1, wherein a radio frame to be transmitted and the defined channel reservation window have different lengths.

16. The apparatus of claim 1, wherein the apparatus is further caused to perform operations comprising:
exchanging channel reservation window usage information with at least one neighbouring network node.

17. A method comprising:
setting, by a radio device, length for each of the at least one channel reservation window such that each channel reservation window comprises a plurality of subframes;
dividing the length of each channel reservation window into a transmission part and an idle part, wherein the idle part comprises one or more symbols in one subframe;
maximizing, at a symbol level accuracy, the length of the transmission part such that a ratio between the length of the idle part and the length of the transmission part fulfils a predetermined criterion; and
concatenating the transmission part and the idle part so as to form the channel reservation window.

18. The method of claim 17, further comprising:
dividing the transmission part into a first and a second sub-block, wherein length of the first sub-block corresponds to the length of the channel reservation window minus one subframe and wherein the idle part and the second sub-block are comprised in the same sub-frame; and
maximizing, at the symbol level accuracy, the length of the second sub-block within the subframe such that the ratio between the length of the idle part and the length of the transmission part fulfils the predetermined criterion.

19. The method of claim 17, wherein the idle part and the second sub-block are comprised in the last sub-frame of the channel reservation window.

20. The method of claim 17, wherein the idle part accommodates a clear channel assessment-process.

21. The method of claim 17, further comprising: time positioning the transmission part with respect to a predetermined reference.

22. The method of claim 17, further comprising: selecting one of a plurality of channel reservation windows having different lengths for data transmission.

* * * * *